(12) United States Patent
Garth

(10) Patent No.: US 8,430,419 B2
(45) Date of Patent: Apr. 30, 2013

(54) VEHICLE COUPLING DEVICE

(76) Inventor: Ian Garth, Seville (AU)

( * ) Notice: Subject to any disclaimer, the term of this patent is extended or adjusted under 35 U.S.C. 154(b) by 7 days.

(21) Appl. No.: 13/030,497

(22) Filed: Feb. 18, 2011

(65) Prior Publication Data

US 2011/0204594 A1 Aug. 25, 2011

Related U.S. Application Data

(60) Provisional application No. 61/305,701, filed on Feb. 18, 2010.

(51) Int. Cl.
*B60D 1/54* (2006.01)

(52) U.S. Cl.
USPC .............. 280/491.1; 280/416.1; 280/491.3

(58) Field of Classification Search .............. 280/416.1, 280/491.1, 491.3, 415.1
See application file for complete search history.

(56) References Cited

U.S. PATENT DOCUMENTS

| | | | | |
|---|---|---|---|---|
| 2,671,674 A | * | 3/1954 | Derksen | 280/491.2 |
| 2,872,213 A | * | 2/1959 | Hosford | 280/416.1 |
| 4,662,647 A | * | 5/1987 | Calvert | 280/490.1 |
| 4,729,571 A | | 3/1988 | Tienstra | |
| 5,106,114 A | | 4/1992 | Haupt | |
| 5,211,416 A | | 5/1993 | Blacklaw | |
| 5,265,899 A | * | 11/1993 | Harrison | 280/416.1 |
| 5,322,313 A | | 6/1994 | Schroeder | |
| 5,890,727 A | | 4/1999 | May | |
| 5,915,714 A | * | 6/1999 | Bell et al. | 280/456.1 |
| 6,485,045 B1 | | 11/2002 | King | |
| 6,497,428 B2 | * | 12/2002 | Ross | 280/415.1 |
| 7,673,894 B2 | * | 3/2010 | Bender | 280/406.1 |
| 7,837,216 B1 | * | 11/2010 | Greaves et al. | 280/491.4 |
| 2003/0127827 A1 | * | 7/2003 | Hulsey et al. | 280/491.3 |
| 2007/0024027 A1 | * | 2/2007 | Pratt et al. | 280/495 |
| 2007/0024061 A1 | * | 2/2007 | Zhang et al. | 292/16 |

FOREIGN PATENT DOCUMENTS

| | | |
|---|---|---|
| AU | 2009201870 A | 12/2009 |
| GB | 2422285 A | 7/2006 |

* cited by examiner

*Primary Examiner* — Anne Marie Boehler
*Assistant Examiner* — Maurice Williams
(74) *Attorney, Agent, or Firm* — Lerner, David, Littenberg, Krumholz & Mentlik, LLP

(57) ABSTRACT

A vehicle coupling device 10 for coupling a vehicle to another vehicle. The coupling device 10 comprises a mount 12 for mounting the coupling device 10 to the vehicle. The device 10 also comprises a first coupling 14 and a second coupling 16. Each of the first and second couplings 14, 16 is connected to a support 18 and movable relative to the mount 12 between an operative position and an inoperative position.

13 Claims, 3 Drawing Sheets

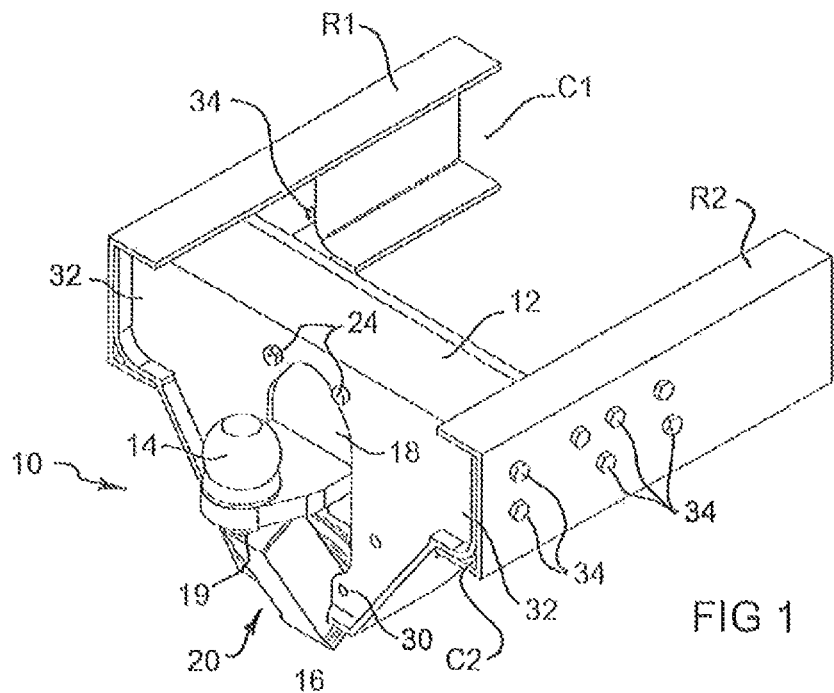
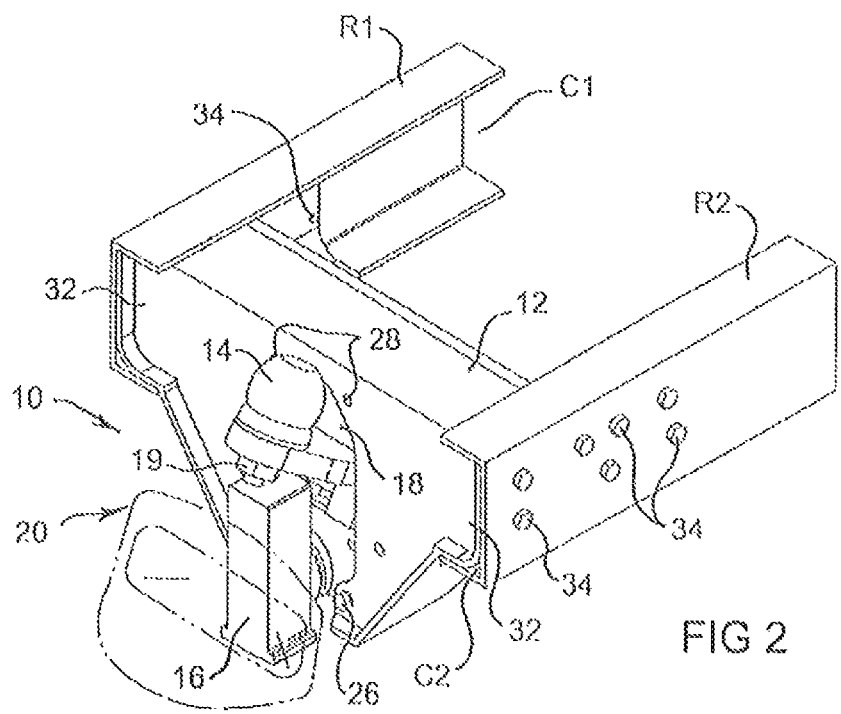

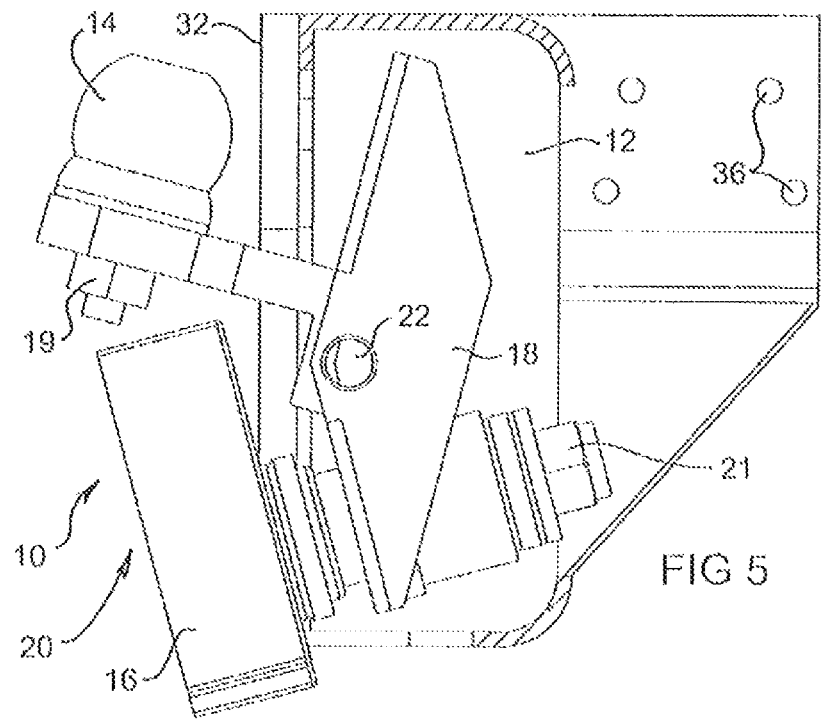
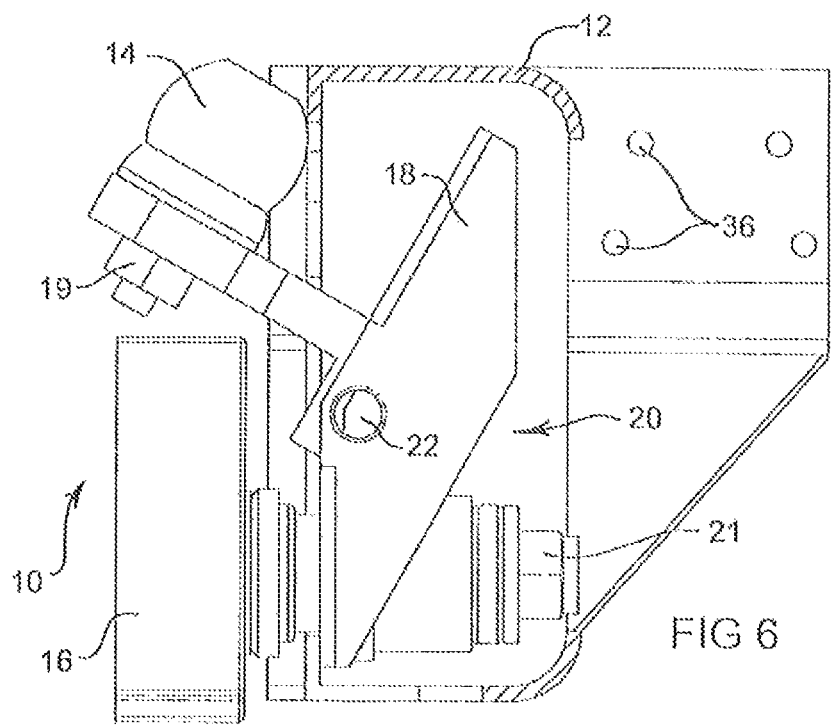

VEHICLE COUPLING DEVICE

CROSS-REFERENCE TO RELATED APPLICATIONS

This application claims the benefit of the filing date of U.S. Provisional Patent Application No. 61/305,701, filed Feb. 18, 2010, the disclosure of which is hereby incorporated herein by reference.

BACKGROUND OF THE INVENTION

1. Field of the Invention

The present invention relates generally to the coupling of one vehicle to another vehicle. More particularly, the invention relates to an arrangement for coupling a motor vehicle to another vehicle. The invention will be specifically described hereinafter in the context of coupling a trailer to a truck. However, it is to be appreciated that the invention has broader application than this specific application, and may be used for coupling together other vehicle types.

2. Description of the Prior Art

Road freight transport in Australia and New Zealand, as in other countries and regions of the world, is a vital component of a nation's transport infrastructure. Trucks are used in the transport of a massive variety of goods all over Australia and New Zealand and over a range of distances, including relatively short distances, as well as over longer distances.

Trucks are available in a multitude of types, sizes and cargo capacities, in part to meet the various demands required for the transport of goods.

In general, the transport capacity and versatility of a truck can be increased when used in conjunction with a trailer or other towed vehicle coupled to the rear of the truck in question.

Hereinafter, trailers and other towed vehicles will be collectively referred to as "trailers". This is not intended in any way to limit the scope of the invention sought in the application.

Like trucks, trailers are available in a large range of types, sizes and cargo capacities.

Towing a trailer behind a truck requires a truck coupling provided at or near the rear of the truck for coupling to a mating component provided on the trailer. There are two common types of couplings used in Australia and New Zealand, these being the Ringfeder® coupling and the Bartlett® ball coupling. Trucks in Australia and New Zealand configured for towing trailers usually include one of these two coupling types, or an equivalent coupling type.

In broad terms, a Ringfeder® coupling is mounted to the rear of a truck and usually includes an opening facing rearwardly of the truck for receiving a towing eye provided at the distal end of a drawbar mounted to and extending forwardly from a trailer. Insertion of the towing eye through the opening causes the eye to contact a coupling bolt of the coupling. The bolt can be manually raised in a vertical direction to allow entry of the towing eye. The bolt can then be lowered through a bolt receiving hole provided in the eye once the hole in the eye aligns with the bolt. A safety device is provided to prevent inadvertent removal of the bolt from the towing eye. The safety device must be disengaged before the truck and trailer can be disconnected.

Generally, Ringfeder® couplings are used for trailers having wheels located at the front and rear of the trailer. During towing, longitudinal and transverse loads are transferred from the truck to the trailer and vice versa through the Ringfeder® coupling. Ringfeder® couplings experience negligible vertical loads as the weight of the trailer is supported evenly by the trailer's wheels. This, in turn, reduces wear on the truck's suspension and reduces the stress experienced by the truck's chassis. Ringfeder® couplings are generally known for their ease of hook-up. In this regard, the coupling bolt is simply raised until the Ringfeder® coupling and towing eye come together, at which time the coupling bolt is lowered and the coupling secured. One drawback of Ringfeder® couplings is that they are generally not designed for supporting substantive vertical loading and so are unsuitable for use with trailers having wheels at the centre or rear of the trailer body.

A Bartlett® ball coupling is configured as a load bearing truck/trailer connection, such that it can accommodate substantive vertical loading. As such, it is used for plant trailers, which only have wheels at the centre or rear of the trailer body. Longitudinal, transverse and vertical loads are each transferred through the Bartlett® ball coupling.

In overall appearance, a Bartlett® ball coupling resembles a conventional car tow bar ball, although it is to be appreciated that a Bartlett® ball coupling is more robust than a conventional tow bar, given the larger loads it is potentially subject to.

Desirably, Bartlett® ball couplings can accommodate load bearing applications, and are substantially free of the backlash and wear encountered in Ringfeder® couplings. Undesirably, however, Bartlett® ball couplings are generally more difficult to couple and uncouple than Ringfeder® couplings.

The versatility of any existing truck fitted with a towing coupling is limited to the extent that the truck is unable to tow trailers fitted with an incompatible coupling. For example, a truck fitted with a Ringfeder® coupling cannot be used to tow a trailer fitted with a Bartlett® ball coupling, even though it may at times be convenient or desirable to do so. Similarly, a truck fitted a Bartlett® ball coupling cannot be used to tow a trailer fitted with a Ringfeder® coupling.

Removing a Ringfeder® coupling and replacing it with a Bartlett® ball coupling (or vice versa) requires several hours of labour and multiple safety checks. This procedure can be potentially dangerous if the correct equipment and safety procedures are not followed. Therefore, it is generally time consuming and otherwise inconvenient to swap the type of coupling fitted to a truck in order to tow a different trailer type.

Moreover, the generally limited coupling mounting locations provided on the rear of a truck make it unfeasible to separately mount both Ringfeder® and Bartlett® ball couplings.

Thus, trucks are generally only capable of towing a certain type of trailer throughout their respective working lives, which is undesirable. It also undesirably increases the presence of trucks on the road and hence raises vehicle emissions.

It would therefore be desirable to provide an arrangement whereby a truck can conveniently tow trailers having different coupling types including, but not limited to a Ringfeder® coupling and a Bartlett® ball coupling.

The above discussion of documents, acts, materials, devices, articles and the like is included in this specification solely for the purpose of providing a context for the present invention. It is not suggested or represented that any of these matters formed part of the prior art base or were common general knowledge in the field relevant to the present invention as it existed before the prior date of each claim of this application.

SUMMARY OF THE INVENTION

According to a broad aspect the present invention, there is provided a vehicle coupling device for coupling a vehicle to another vehicle. The coupling device includes a mount for mounting the coupling device to the vehicle. The device also includes a first coupling and a second coupling. Each of the first and second couplings is connected to a support and movable relative to the mount between an operative position and an inoperative position.

In a preferred form, the first and second couplings and support define a coupling body. The first and second couplings are preferred separately formed and connected to the support, although one or more of the first and second couplings and support may be integrally formed if desired.

In one form, one or both of the first and second couplings are releasably connected to the support to enable removal from the support and possible replacement by a different coupling type, if required.

In one preferred form, the coupling body is pivotably movable relative to the mount.

In one form, the coupling body is pivotably movable relative to the mount between at least two positions. The at least two positions may include a first position corresponding to an operative position for the first coupling and an inoperative position for the second coupling, and a second position corresponding to an operative position for the second coupling and an inoperative position for the first coupling.

The vehicle coupling device preferably includes a securing means for releasably securing the coupling body to the mount in each of the first and second positions (and any other desired position) to prevent rotation of the coupling body relative to the mount during use of the coupling.

The securing means may adopt any suitable form. For example, the securing means may include one or more screw threaded fasteners for receiving in substantially aligned receiving apertures provided in each of the coupling body and the mount when the coupling body is in each of the first position and the second position. The screw threaded fastener(s) may of course be replaced with any other suitable arrangement, such as securing pins or the like.

The first coupling may include any suitable coupling type. For example, the first coupling may include a Ringfeder® coupling (or equivalent), a Pintle Hook coupling (as used on many army vehicles), a Jost Hitch coupling, a Bartlett® ball coupling, any other ball-type coupling, or any other coupling type. In a particularly envisaged but non-limiting form, the first coupling includes a Bartlett® ball coupling.

Similarly, the second coupling may include any suitable coupling type, including a Ringfeder® coupling (or equivalent), a Pintle Hook coupling, a Jost Hitch coupling, a Bartlett® ball coupling, any other ball-type coupling, or any other coupling type. In one preferred form (but non-limiting form), the second coupling includes a Ringfeder® coupling.

It is to be appreciated that the first and second couplings would generally be selected as different coupling types, so as to improve the truck versatility in terms of increasing the range of trailers that may be towed by the truck (or other vehicle).

The mount preferably includes a vehicle chassis mount for mounting to a vehicle chassis. In one form, the mount is configured for receipt between and within a pair of facing channels of respective vehicle chassis rails.

The invention may be provided without one or both of the first and second couplings fitted, which may be later attached.

The invention has, so far, been generally described in terms of a coupling device. However, it is to be appreciated that the invention is also directed to a vehicle (such as, but not limited to a truck) including the previously described coupling device.

BRIEF DESCRIPTION OF THE DRAWINGS

It will be convenient to hereinafter describe a preferred embodiment of the invention with reference to the accompanying drawings. The particularity of the drawings is to be understood as not limiting the preceding broad description of the invention.

FIG. 1 is a perspective view of a vehicle coupling device when mounted between the chassis rails of a vehicle and in one operative position.

FIG. 2 is a perspective view of the device illustrated in FIG. 1 in another operative position when mounted between the chassis rails of a vehicle.

FIG. 5 is a partial sectional side view of the device illustrated in FIG. 1 illustrated in a transitional position part-way between the operative positions illustrated in FIGS. 1 and 2.

FIG. 6 is a partial sectional side view of the device in the operative position as illustrated in FIG. 2.

DETAILED DESCRIPTION

Figure 3:
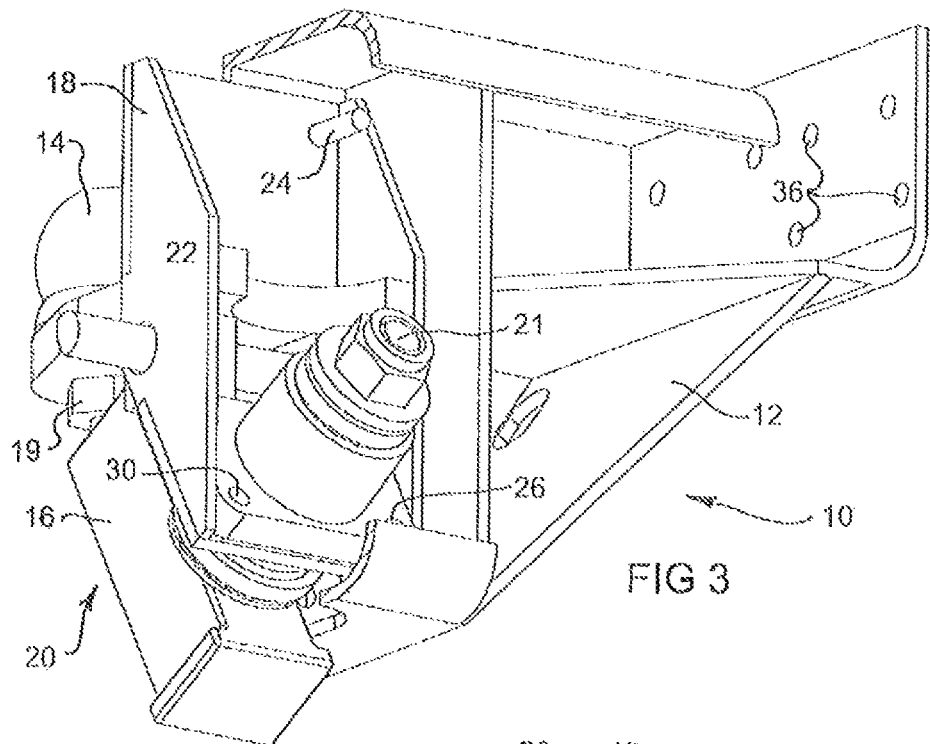
FIG. 3 is another perspective view of the device as illustrated in FIG. 1, but excluding the vehicle chassis rails.

Referring to the drawings, there is illustrated one non-limiting embodiment of a vehicle coupling device 10 according to the present invention. The device 10 is provided for coupling a vehicle to another vehicle, and specifically (although not exclusively) configured as a coupling for use on a truck for towing a trailer.

The coupling device 10 includes a mount 12 for mounting the coupling device 10 to the vehicle.

The device 10 also includes a first coupling 14 in the form of a Bartlett® ball coupling and a second coupling 16 in the form of a Ringfeder® coupling (shown diagrammatically for clarity of the drawings). Each of the first and second couplings 14, 16 is connected to a support 18 having a support frame (also generally identified by '18') and movable relative to the mount 12 between an operative position and an inoperative position.

It is to be appreciated that, in one form, the device may be supplied without the first and second couplings 14, 16 fitted.

The first and second couplings 14, 16 and support 18 define a coupling body 20. The first and second couplings 14, 16 are separately formed and connected to the support 18. The first coupling 14 is connected to the support 18 by way of a threaded shaft and nut combination 19, as provided on a Bartlett® ball coupling. The second coupling 16 is connected to the support 18 by way of an arrangement including a threaded shaft and nut combination 21, as provided on a Ringfeder® coupling.

The coupling body 20 is pivotably movable relative to the mount 12 about pivot axle 22. The pivot axle 22 is secured in position in the mount 12.

Figure 4:
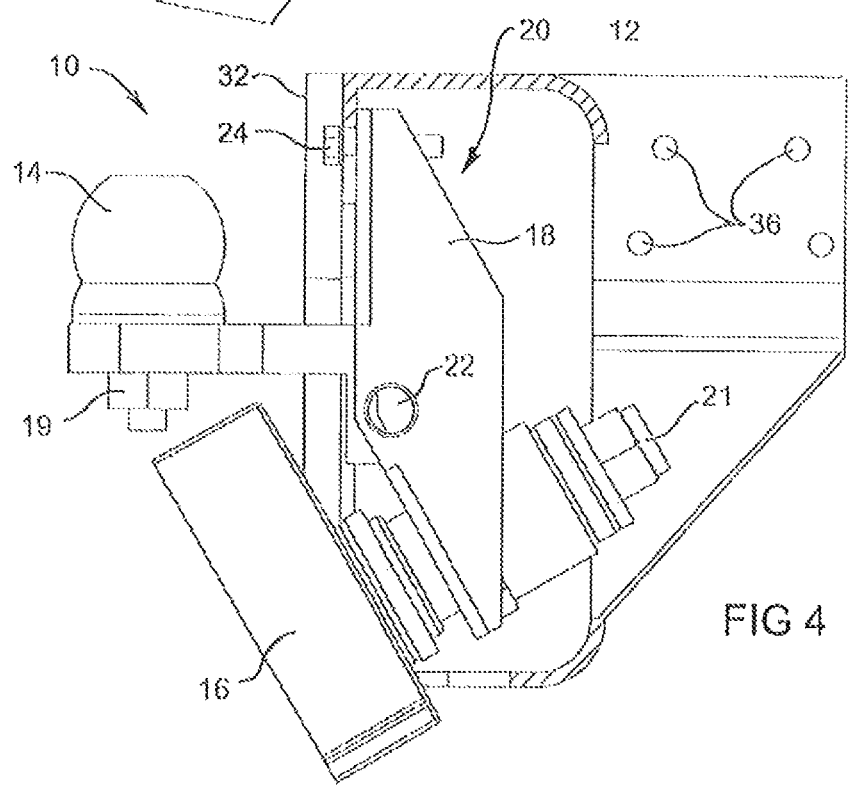
FIG. 4 is a partial sectional side view of the device in the operative position as illustrated in FIG. 1.

The coupling body 20 is pivotably movable relative to the mount 12 between two positions, including a first position (illustrated in FIGS. 1, 3 and 4) corresponding to an operative position for the first coupling 14 and an inoperative position for the second coupling 16; and a second position (illustrated in FIGS. 2 and 6) corresponding to an operative position for the second coupling 16 and an inoperative position for the first coupling 14.

The vehicle coupling device 10 includes a securing means in the form of screw threaded fasteners 24, 26 for releasably securing the support 18 to the mount 12 in each of the first and second positions to prevent rotation of the couplings 14, 16 relative to the mount 12. The fasteners 24, 26 engage respective threaded holes 28, 30 provided in the face 32 of the mount 12 and the support 18. The fasteners 24 and holes 28 are used to secure the coupling body 20 in the first position for use of the Bartlett® ball coupling; while the fasteners 26 and holes 30 are used to secure the coupling body in the second position for use of the Ringfeder® coupling. The fasteners 24, 26 would likely be the same fasteners used to retain the support 18 in each of the two coupling positions.

It can be appreciated that it would be a relatively quick and easy task to reconfigure the device 10 between use as a Ringfeder® coupling and a Bartlett® ball coupling, simply by removing the fasteners 24 or 26 securing the body 20 in position, rotating the body 20 relative to the mount 12 between the positions illustrated in FIGS. 1 and 2 and reinserting the fasteners 24/26 in the appropriate holes 28/30. FIG. 5 illustrates a transitional position of the body 20 between the positions illustrated in FIGS. 1 and 2, and in which the body 20 is freely pivotable relative to the mount 12.

The mount 12 includes a vehicle chassis mount 32 for mounting to the vehicle chassis. More particularly, the chassis mount 32 is configured for receipt between and within a pair of facing channels C1, C2 of respective vehicle chassis rails R1, R2. The mount 12 is secured in place by way of fasteners 34 (only some of which have been numbered) extending through apertures 36 (again, only some of which have been numbered) provided in the rails R1, R2 and mount 12.

Each of the various components of the device 10 is manufactured from a suitable grade steel, or any other suitable material(s).

It is to be appreciated that the device 10 may be modified to suit the specific mounting dimensions and towing capacity required. Thus, the specific size and shape of the device 10 may be varied.

Desirably, the coupling device 10 provides an arrangement whereby a truck can conveniently tow trailers having different coupling types. Again, specific reference has been made to the device 10 including a Ringfeder® coupling and a Bartlett® ball coupling. However, the device 10 could be configured for use with other couplings types, if desired.

Finally, it is to be understood that the various alterations, modifications and/or additions may be introduced into the construction and arrangement of the parts previously described without departing from the spirit or ambit of this invention.

Without limiting the claim scope that may be sought in any Australian or overseas patent application claiming priority from the present application, the following claims are provided.

What is claimed is:

1. A vehicle coupling device for coupling a vehicle to another vehicle, the coupling device comprising:
   a mount for mounting the coupling device to the vehicle; and
   a first coupling and a second coupling, each of the first and second couplings being connected to a support and movable relative to the mount between an operative position and an inoperative position, the first and second couplings and support defining a coupling body, and the coupling body being pivotably movable relative to the mount,
   wherein the coupling body is pivotably movable relative to the mount between two positions, comprising a first position corresponding to an operative position for the first coupling and an inoperative position for the second coupling, and a second position corresponding to an operative position for the second coupling and an inoperative position for the first coupling,
   the coupling body being pivotably movable relative to the mount about a pivot axle which, in use, is orientated generally horizontally and extends generally transversely of the vehicle, and wherein pivotable movement of the coupling body relative to the mount about the pivot axle between the first position and the second position is less than 90°, and
   wherein the first coupling and second coupling are different coupling types.

2. A vehicle coupling device according to claim 1, wherein the support comprises a support frame.

3. A vehicle coupling device according to claim 1, comprising a securing means for releasably securing the coupling body to the mount in each of the first and second positions to prevent rotation of the coupling body relative to the mount.

4. A vehicle coupling device according to claim 3, wherein the releasable securing means comprises at least one of a screw threaded fastener and a pin for receiving in substantially aligned apertures provided in each of the coupling body and mount when the coupling body is in each of the first position and the second position.

5. A vehicle coupling device according to claim 1, wherein the first coupling comprises one of a pin coupling, a hook coupling, and a ball coupling.

6. A vehicle coupling device according claim 5, wherein the first coupling comprises a ball coupling.

7. A vehicle coupling device according to claim 1, wherein the second coupling comprises one of a pin coupling, a hook coupling, and a ball coupling.

8. A vehicle coupling device according to claim 7, wherein the second coupling comprises a pin coupling.

9. A vehicle coupling device according to claim 1, wherein the mount comprises a vehicle chassis mount for mounting to the vehicle chassis.

10. A vehicle coupling device according to claim 9, wherein the mount is configured for receipt between and within a pair of facing channels of respective vehicle chassis rails.

11. A vehicle comprising a vehicle coupling device according to claim 1.

12. A vehicle coupling device for coupling a vehicle to another vehicle, the coupling device comprising:
   a mount for mounting the coupling device to the vehicle; and
   a first coupling mount for mounting a first coupling and a second coupling mount for mounting a second coupling, wherein each of the first and second coupling mounts is provided on a support and is movable relative to the mount between an operative position and an inoperative position, the support being pivotably movable relative to the mount,
   wherein the support is pivotably movable relative to the mount between two positions, comprising a first position corresponding to an operative position for a first coupling when mounted to the first coupling mount and an inoperative position for a second coupling when mounted to the second coupling mount, and a second position corresponding to an operative position for the second coupling and an inoperative position for the first coupling,
   the support being pivotably movable relative to the mount about a pivot axle which, in use, is orientated generally horizontally and extends generally transversely of the vehicle, and pivotable movement of the support relative to the mount about the pivot axle between the first position and the second position is less than 90°, and wherein, in use, the first coupling and second coupling are different coupling types.

13. A vehicle comprising a vehicle coupling device according to claim 12.

\* \* \* \* \*